Sept. 25, 1951  H. S. BURK  2,568,946
MANUFACTURE OF PARAFFIN WAXES
Filed March 10, 1948
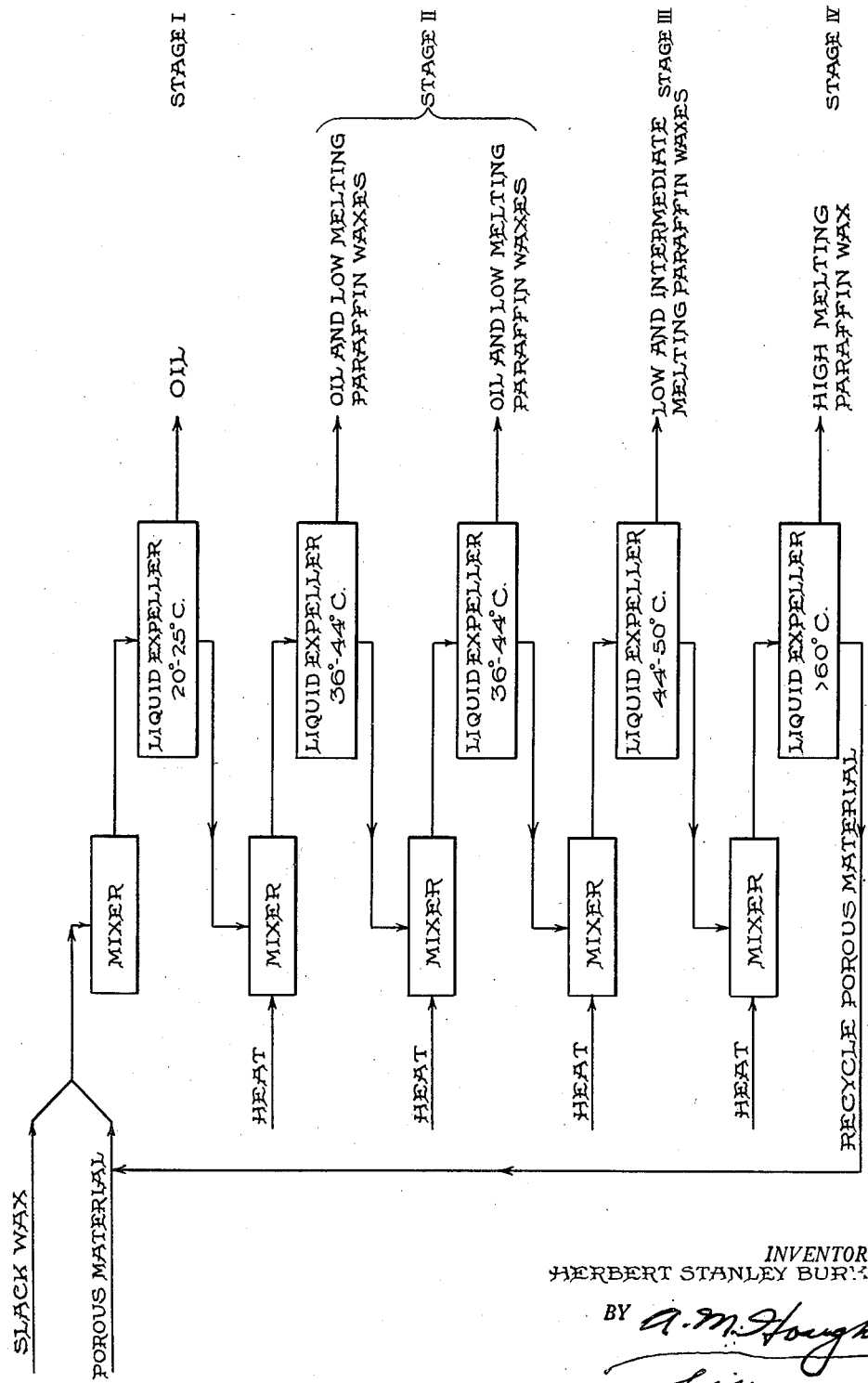
INVENTOR.
HERBERT STANLEY BURK
BY
ATTORNEY Patented Sept. 25, 1951

2,568,946

UNITED STATES PATENT OFFICE 2,568,946

MANUFACTURE OF PARAFFIN WAXES

Herbert Stanley Burk, Maplewood, La., assignor to Gulf Research & Development Company, Pittsburgh, Pa., a corporation of Delaware Application March 10, 1948, Serial No. 14,042

3 Claims. (Cl. 196—17)

This invention relates to the manufacture of paraffin waxes, and in particular concerns an improved process for recovering crystalline paraffin waxes from slack wax.

In the processing and refining of petroleum oils, the wax-like components thereof are usually separated and recovered by initially distilling the oil to obtain a so-called "wax distillate" fraction, and thereafter subjecting such fraction to refrigeration and filter pressing. The wax product recovered from the filter-press is a soft unctuous material comprising the crystalline paraffin waxes and from 25 to 60 per cent by weight of oil. This product, known as "slack wax," is of little commercial value and must be further processed to remove or substantially reduce its oil content. This is accomplished by subjecting the slack wax to a so-called "sweating" operation which consists essentially in gradually raising the temperature of the wax while permitting the oil and lower-melting wax components to drain away from the higher-melting waxes. By repeating this operation a number of times with suitable recycling of the low-melting waxes, it is possible to separate the slack wax into an arbitrary number of fractions ranging from liquid oil through waxes of low and intermediate melting points to the scale waxes and refined waxes which comprise the higher-melting wax components of the original petroleum oil. Such operation, however, is notably inefficient in that it is inherently time-consuming and is not well adapted to continuous practice. Even under optimum conditions of operation with extensive recycling of the intermediate wax fractions, the yield of the more valuable waxes of higher melting point is relatively low. Many attempts have been made to improve the efficiency of the sweating operation, but except for certain improvements in the mechanical equipment employed, little progress has been made and the process has remained essentially unchanged over a period of years.

It is accordingly an object of the present invention to provide an improved process for recovering crystalline paraffin waxes from oil-containing waxes such as slack wax.

Another object is to provide a slack wax refining process which is less time-consuming than the conventional sweating process.

A further object is to provide a continuous process for refining slack wax.

A still further object is to provide a process for refining slack wax whereby improved yields of the higher-melting wax components are attained.

Other objects will be apparent from the following detailed description of the invention, and various advantages not specifically referred to herein will become apparent to those skilled in the art upon employment of the invention in practice.

I have now found that the above and related objects may be realized in a process whereby slack wax or other oil-containing wax is treated to increase its porosity, and is thereafter subjected to one or more liquid-expelling operations carried out at temperatures between the melting point of the highest melting component and the solidification point of the lowest melting component of the slack wax. Such process may be operated so as to separate the slack wax into oil and wax fractions similar to those obtained by the conventional sweating procedure, but effects such separation with a higher degree of selectivity and with consequent improvement in the yield of the higher-melting products. Also, since initially increasing the porosity of the wax mass enables the use of mechanical equipment to forcibly expel the oil and liquified low-melting waxes from the mass, the process is much less time-consuming than the conventional sweating operation wherein liquid is separated from solid wax by force of gravity alone. Furthermore, since such mechanical equipment may be of a type adapted for continuous operation, the process may be carried out in a continuous manner with consequent operational and economical advantages.

Referring now to the single figure of the accompanying drawing, which is a diagrammatic representation of a flow sheet illustrating one embodiment of the process of the invention, it will be seen that the process is preferably carried out in a number of separate stages, the first of which consists in mixing the slack wax with finely divided inert porous material and thereafter subjecting the resulting mixture to a liquid-expelling operation carried out at the temperature at which it is desired to remove the first oil and/or wax fraction, e. g. at 20°–25° C. The variety of porous materials which may be employed for admixing with the slack wax is limited only by the requirement that the material be of porous structure and inert toward petroleum oils and waxes, e. g., wood sawdust, grain hulls and other cellulosic materials, asbestos floc, diatomaceous earth, etc. Wood sawdust is preferred by reason of its low cost and availability. As is more fully explained hereinafter, the final stage of the process consists in separating the inert porous material from the scale wax product. By using in the initial stage of the process the porous material separated in the final stage of a previous operation, economy may be effected not only in the re-employment of the porous material itself but also in the recovery of the wax with which the porous material is saturated. When operating continuously, the same economy may be effected by continuously re-cycling the porous material separated in the final stage back to the initial stage. If desired, however, fresh porous material may be employed in the initial stage, and the wax-saturated material obtained in the final stage may be put to other uses, as for example in the manufacture of wax-impregnated sheet products, etc.

The mixing operation may be carried out in various ways. Preferably, the slack wax is warmed to the temperature to be employed in the subsequent liquid-expelling operation, and the inert porous material, which has likewise been warmed to such temperature, is then mixed into the wax to obtain a homogeneous composition. Alternatively, the slack wax may be entirely melted and admixed with the inert porous material while in the liquid state. Such procedure obviates the use of heavy mixing equipment, but on the other hand necessitates cooling the mixture before subjecting it to the liquid-expelling operation.

The amount of porous material admixed with the slack wax depends upon the nature of both the wax and the porous material. There should be sufficient porous material present to permit the ready expulsion of liquid components from the wax mass, but at the same time there should not be so much that the handling of an excessive amount of the porous material is required. Ordinarily, the optimum amount of inert porous material will be between about 5 and about 10 per cent by weight of the slack wax, although with some types of slack wax as much as 25 per cent of the porous material may be required.

The liquid-expelling operation to which the mixture of slack wax and inert porous material is subjected is carried out in such manner that the liquid content of the mixture is forcibly expelled from the mass. The use of centrifuges, particularly those of the continuous type, is preferred for this operation, although other types of equipment may also be employed. The temperature at which the initial liquid-expelling operation is effected depends upon the nature of the slack wax undergoing treatment and upon the degree of refinement to be secured in the initial stage. Ordinarily it is desirable that the initial stage of the process results in the separation of only the normally liquid oil components of the slack wax. Accordingly, with conventional slack waxes, the initial liquid-expelling operation is usually carried out at approximately room temperature, e. g., at about 20°–25° C., although higher temperatures may be employed if there is no objection to separating low-melting waxes along with the normally liquid oil.

The second and subsequent stages of the process, with exception of the final stage, consist merely in additional liquid-expelling operations, each of which is carried out at a temperature higher than that of the preceding stage. The number of such stages, and the temperature at which each is carried out will depend upon the number of fractions of oil and low- and intermediate-melting waxes desired. Ordinarily at least two such intermediate stages are employed so that there is obtained, in addition to the oil fraction separated in the initial stage, a first intermediate fraction essentially comprising low-melting waxes, i. e., waxes having a melting point below about 45° C., a second intermediate fraction essentially comprising intermediate-melting waxes, i. e., waxes having a melting point between about 45° C. and about 55° C., and a residue comprising a mixture of the high-melting waxes and the inert porous material. In such a process, the intermediate stages are usually carried out at temperatures of about 35°–45° C. and about 45°–55° C., respectively. If desired, one or more of the intermediate stages may comprise several liquid-expelling operations carried out at the same temperature. Thus, in the figure, Stage II is shown as consisting of two liquid-expelling operations, both of which are carried out at a temperature of about 36°–44° C., whereas Stage III consists of a single liquid-expelling operation carried out at a temperature of about 44°–50° C. Similarly, as illustrated by the figure, each of the liquid-expelling operations may be preceded by a mixing operation which serves to insure uniform temperature and homogeneous composition in the wax mass. Such mixing operation, however, is not essential to the successful operation of the process, and if desired the wax mass may be passed directly from one liquid-expelling operation to the next.

The final stage of the process consists in separating the mixture of inert porous material and high-melting wax which is obtained as a solid residue from the final liquid-expelling operation. Such separation is conveniently carried out by heating the mixture to a temperature above the melting point of the wax and thereafter separating the inert porous material from the liquid wax by centrifuging, filter-pressing, settling, or other convenient operation. Alternatively, if desired, the mixture may be dissolved in an organic solvent and the solid porous material separated by simple filtration or other means. The wax may then be recovered from the solution by refrigeration and filtering, or by distilling off the solvent. Usually the wax product is finished in the conventional manner by treating it with clay, sulfuric acid, etc., to improve its color.

In a typical operation of the process of the invention, 200 parts by weight of a slack wax obtained from an East Texas crude and having a melting point of about 45.6° C. and a liquid oil content of about 25 per cent by weight were warmed to a temperature of about 21° C. and then mixed with 42 parts by weight of wood sawdust. The latter contained about 4.0 per cent by weight of paraffin wax having a melting point of about 50° C., and was typical of the wax-impregnated sawdust product separated in the final stage of the process. The mixture of slack wax and sawdust was then subjected to a first liquid-expelling operation carried out by centrifuging for 1 minute at a speed of 3600 R. P. M. while maintaining a temperature of about 21° C., whereby there was removed about 40.5 parts by weight of oil. The solid residue was heated to a temperature of about 42° C., and after mixing to insure a homogeneous composition, was subjected to a second liquid-expelling operation carried out by centrifuging for 1 minute at a speed of 3600 R. P. M. while maintaining a temperature of about 42° C. Approximately 57.5 parts by weight of liquified low-melting waxes were removed by the second centrifuging operation. The solid residue was then melted and filtered to separate the sawdust from the high-melting wax components, whereby there was obtained 93.6 parts by weight of scale wax having an oil content of 2.2 per cent and a melting point of about 51.6° C.

While the above-described procedure serves to illustrate in a general way the operation of the process of the invention, it is to be understood that many variations in operating procedure are permitted within the scope of the invention. In particular, the number of separate liquid-expelling operations and the temperatures at which they are carried out may be arbitrarily varied depending upon the desired degree of separation of the various components of the crude slack wax. Ordinarily, it will be desirable to employ at least three liquid-expelling operations carried out at successively higher temperatures, but in some instances two or even one of such operations may be sufficient to effect the desired degree of refinement. Similarly, the process may be carried out batch-wise, semi-continuously, or fully continuously employing well-known engineering techniques, and any or all of the intermediate products separated may be recycled back to a prior stage of operation one or more times.

Other modes of applying the principle of my invention may be employed instead of those explained, change being made as regards the process herein disclosed provided the step or steps stated by the following claims, or the equivalent of such stated step or steps, be employed.

I, therefore, particularly point out and distinctly claim as my invention:

1. The process for the manufacture of paraffin wax from a slack wax consisting of crystalline waxes and from about 25 to about 60 per cent by weight of oil, which comprises preparing a mixture consisting of said slack wax and between about 5 and about 25 per cent by weight of wood sawdust, centrifuging said mixture at a temperature between about 20° C. and about 25° C. to separate therefrom the normally liquid oil content of the slack wax, subjecting the residue to a second centrifuging operation at a temperature between about 35° C. and about 45° C. to separate therefrom low-melting wax components, subjecting the residue from said second centrifuging operation to a third centrifuging operation at a temperature between about 45° C. and about 55° C. to separate therefrom intermediate-melting wax components, and separating the wood sawdust from the wax residue from said third centrifuging operation.

2. The process for the manufacture of paraffin wax from a slack wax consisting of crystalline paraffin waxes and from about 25 to about 60 per cent by weight of oil, which comprises preparing a mixture consisting of said slack wax and an inert porous material, subjecting said mixture to at least one centrifuging operation at a temperature between the melting point of the highest melting component of the slack wax and the solidification point of the lowest melting component of the slack wax to separate from said mixture the normally liquid oil content of the slack wax and the wax liquid at the temperature employed, and thereafter separating the inert porous material from the solid wax residue remaining from said centrifuging operation.

3. The process for the manufacture of paraffin wax from a slack wax consisting of crystalline paraffin waxes and from about 25 to about 60 per cent by weight of oil, which comprises preparing a mixture consisting of said slack wax and an inert porous material, subjecting said mixture to a centrifuging operation at room temperature to separate therefrom the normally liquid oil content of the slack wax and subjecting the solid wax residue to a plurality of centrifuging operations at temperatures between the melting point of the highest melting component of the slack wax and the solidification point of the lowest melting component of the slack wax, each of said centrifuging operations being carried out on the solid residue remaining from the preceding centrifuging operation and at a temperature higher than that of the preceding centrifuging operation, thereby separating from the solid residue at each of the temperatures employed the wax liquid at said temperatures, and thereafter separating the inert porous material from the solid wax residue remaining from the final centrifuging operation.

HERBERT STANLEY BURK.

REFERENCES CITED

The following references are of record in the file of this patent:

UNITED STATES PATENTS

| Number | Name | Date |
|---|---|---|
| 1,278,023 | Rosenbaum | Sept. 3, 1918 |
| 1,509,325 | Weir et al. | Sept. 23, 1924 |
| 1,577,852 | Petty | Mar. 23, 1926 |
| 1,678,298 | Patrick et al. | July 24, 1928 |
| 1,714,133 | Phillips et al. | May 21, 1929 |
| 1,847,488 | Lindgren et al. | Mar. 1, 1932 |
| 1,939,946 | Baylis | Dec. 19, 1933 |
| 2,145,784 | Anderson et al. | Jan. 31, 1939 |